Patented Oct. 22, 1935

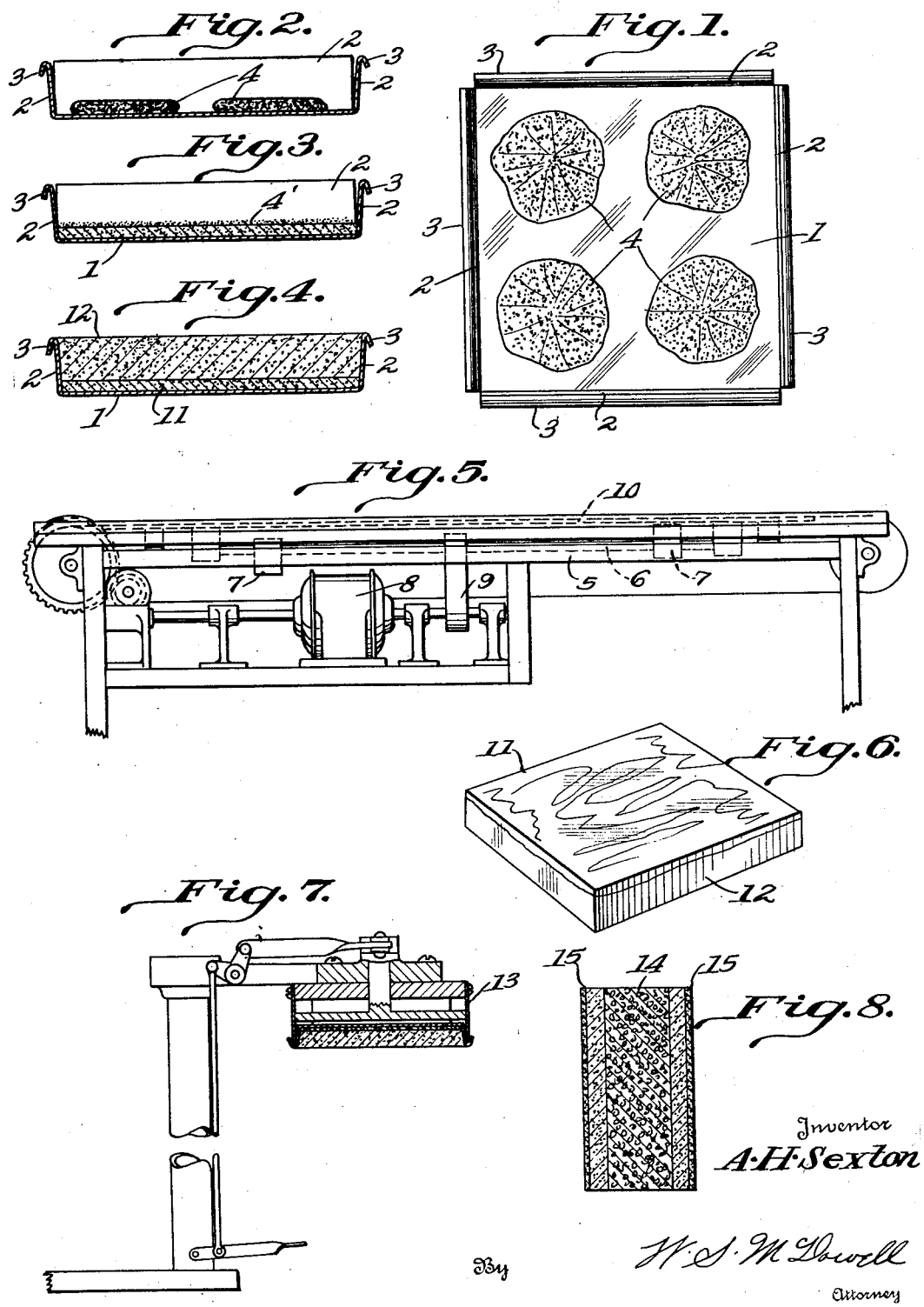
Oct. 22, 1935. A. H. SEXTON 2,018,192
METHOD OF PRODUCING CEMENTITIOUS TILE
Filed Sept. 14, 1932

2,018,192

UNITED STATES PATENT OFFICE 2,018,192

METHOD OF PRODUCING CEMENTITIOUS TILE

August H. Sexton, Portsmouth, Ohio, assignor to Superior Cement Corporation, Portsmouth, Ohio, a corporation of Ohio Application September 14, 1932, Serial No. 633,158

3 Claims. (Cl. 25—155)

This invention relates to an improved cementitious tile of monolithic building unit and to an improved method for producing the same. An outstanding object of the invention is to provide a durable, economically produced monolithic building unit suitable for use in the construction of floors, walls, partitions, ceilings, walks, and in other capacities where a smooth, hard surface is desired, and, also, one of improved appearance.

It is another object of the invention to provide a building unit or tile possessing these desired properties and which is formed substantially entirely from cementitious mixtures which are permitted to cure and harden in the same manner as ordinary cement or concrete mixtures to produce the finished article, avoiding specifically the use of kiln or high temperature burning apparatus and operations now commonly employed in the manufacture of burned clay materials.

It is a further object of the invention to produce a cementitious tile wherein the exposed or wear receiving surface thereof may be decoratively colored to produce pleasing ornamental effects of esthetic value and wherein either solid or multicolored patterns may be utilized to obtain the desired appearances.

The character of the invention may be best understood by reference to the following description when taken in connection with the accompanying drawing, wherein:

Fig. 1 is a top plan view of one of the molds used in carrying out the present invention, disclosing the facing material when the latter is initially deposited in the bottom of the mold prior to vibration thereof and when using a plurality of colors;

Fig. 2 is a vertical sectional view taken through the mold disclosing the facing material when initially deposited in said mold;

Fig. 3 is a similar view disclosing the facing of the material following vibration thereof and also illustrating the application to the upper portion of the facing of a sprinkling of dry cement thereon;

Fig. 4 is a similar view disclosing the mold when completely filled with the facing and backing materials;

Fig. 5 is a view in side elevation of the forming table used in vibrating and conveying the molds;

Fig. 6 is a perspective view of the finished tile;

Fig. 7 is a detailed view disclosing the machine for effecting the release of the sheet metal molds from the formed tile;

Fig. 8 is a vertical sectional view taken through a modified form of tile wherein a cellular clay body is employed.

In carrying out my invention, my improved tile comprises a homogeneous, monolithic body formed to provide a cementitious backing of desired proportions and a facing, also, of cementitious material but having combined therein coloring matter in the form of mineral oxides, the facing being bonded with the backing of the tile during the process of manufacture so that the completed tile will comprise an integral monolithic unit of great strength, durability and improved appearance when in use.

In the formation of my improved tile, I first produce a cementitious mixture which may be composed of equal parts of fine Ottawa sand and Portland cement to which I add about 8% by weight of mineral oxide coloring matter. To these materials I add a sufficient amount of water so that the resulting mixture will possess free flowing fluxive properties equivalent to a cream-like consistency. If the tile pattern is to possess multiple colors, such as red, green, yellow, brown and the like, the facing mixture is made up in separate containers for each color and the fluxive ingredients are thoroughly mixed while in a fluid state so that they will be of uniform composition. This fluxive wet cementitious mixture is then placed in a pan shaped mold, preferably of "stainless" steel or other equivalent material to which the concrete mixture, when dry, will not adhere. Chromium alloys, such as those found in the manufacture of stainless steel, have been found to possess this ability as well as alloys of copper and silicon. For example, an alloy containing substantially 97% of copper and 3% of silicon has been found to be satisfactory.

The mold comprises a pan shaped body formed to include a bottom 1 together with up-turned resilient sides 2, the upper edges of the sides terminating in downwardly directed spaced flanges 3. If the molds are of rectangular formation, as illustrated, the adjoining vertical edges of the side walls 2 are not connected, in order that the side walls, following the hardening and setting of the mixtures placed in the molds, may be spread, by virtue of their resiliency, to permit of the release of the hardened cementitious body. I have experimented with a great number of materials in the formation of these pan shaped molds in order to provide such materials that will be substantially non-adhering with respect to the tile and, in addition, will be substantially resilient. Ordinary galvanized sheet metal will not serve the purpose nor will enameled ware.

Cement will adhere to glass and many other vitreous surfaces and after extended study and observation, I am of the opinion that stainless steel, or the copper alloy specified, constitute the most successful materials which can be used in this capacity, especially in commercial tile manufacture wherein repeated use of the molds is required.

As shown in Figs. 1 and 2, the facing material comprising the wet fluxive mixture is placed on the bottom of the pan shaped mold in splotches when a multiplicity of colors are used. Thus the mixture may be made up in red, yellow, blue and/or green and deposited on the bottom of the pan as indicated at 4. If a single color is employed, the mixture may be positioned in the pan in any desired manner.

The pan shaped mold with the facing mixture is then placed on a vibrator, as disclosed in Fig. 5. This vibrator comprises a frame 5 in which is mounted for rotation a shaft 6 having arranged thereon one or more eccentrics 7, the shaft being driven by a motor 8 and through suitable motion transmitting devices 9. Upon the rotation of the shaft 6, substantially rapid vibration is imparted to the base 10 of the table upon which one or more of the pan shaped molds is placed. This vibration results in the spreading and merging of the fluxive coloring materials 4 constituting the cementitious facing mixture of the tile, so that the facing mixture will spread uniformly over the bottom of the pan to a uniform depth, which may be of variable thickness. The vibration serves, in addition, to cause the required distribution of the coloring matter and substantially eliminates from the mixture entrapped air. Due to the fluxive state of the mixture, the operator may then impart thereto any desired pattern, or disposition of the coloring matter by, for example, reciprocating the pan or by oscillating the same. Again, different color effects or patterns may be obtained by moving a pencil through the fluxive mixture while it is being vibrated or through the use of a brush. By resort to these methods, a substantially limitless number of varying patterns in the finished tile can be obtained consisting of a blending or merging of the primary colors in varying orders. Likewise patterns of geometrical configurations may be produced or, in many instances, merely solid colors. It is my opinion that the vibration imparted to the table not only secures the desired distribution of the coloring matter in the fluxive mixture comprising the coating layer of the tile but also the said coating layer when finished possesses an extremely hard, dense surface of a smooth tile nature. This is due in all probability to the compaction of the fine cement particles on the smooth flat surface of the bottom 1 of the stainless steel mold. Thus the outer surface of the coating will be composed of substantially pure cement with the coarser sand particles embedded in the cement but not projecting through the surface thereof to any appreciable extent. Under a strong magnifying glass, the sand particles are barely perceptible when the tile is completed, and this density and smoothness is believed to be mainly attributed to the action of the vibratory table in the settling of the coating or facing mixture.

Following the step of forming and vibrating in the pan shaped molds the primary mixture, I then apply to the latter, by sprinkling on the same, a fine layer of dry sand and/or cement 4', which quickly takes up the moisture in the coating mixture and sufficiently sets or hardens the latter to admit of the application thereto of the mixture comprising the body or backing of the tile. As shown in Fig. 6, the facing or outer coating of the tile is indicated by the numeral 11, while the body or backing of the tile is indicated at 12. This body layer may also consist of a cementitious mixture composed roughly of one part of cement to three parts of sand, with the addition of sufficient water to produce a plastic and moldable consistency. The body material, in its plastic state, is then spread over the dry cement and the mold filled to the upper edges of the side walls thereof, surplus material being troweled and removed. The mold is again vibrated by the operation of the shaft 6 in order to settle the body material. The period of vibration may be of any suitable duration such for example as of the order of from ten to thirty seconds, after which, the pan shaped molds are removed from the vibrating machine and are placed on suitable racks where they are permitted to stand until the cementitious mixtures dry, set and harden. After a drying of from twelve to twenty-four hours under ordinary atmospheric conditions, the pans may be removed from the tile. This is accomplished by inserting a spreader, as indicated at 13 in Fig. 7, between the flanges 3 and the side walls 2 of the mold so that outwardly directed flexing forces are imparted to said side walls to separate the latter from the tile, allowing the latter to drop from the mold by gravity. By the use of the metals specified in the formation of the molds, the tile may be cast without first applying to the tile receiving surfaces of the mold any kind of a lubricant. When the side walls 2 are flexed outwardly, the tile readily separates by the force of gravity from the molds without any appreciable clinging or adhesion of the tile material to the mold surfaces so that the molds, after washing, may be reused, and injury to the tile avoided. A thorough cleaning of the molds may be effected by immersing the same in a solution consisting of a dilute acid and kerosene. This removes all film from the mold surfaces and renders the latter readily available, after being rinsed with clear water, for re-use in tile formation.

The body layer 12 of the tile, as stated, may comprise a dense cementitious mixture when used in the construction of floors, walks and the like or, in certain instances, as when set up in walls. It is often desirable, however, that when used in walls, or in the formation of building partitions, the material should be as light as possible. This may be accomplished by the addition of gas generating materials in the cementitious materials comprising the body 12 when the latter is initially formed. Or again, it is not necessary that the body 12 must be formed from a cementitious mixture. Thus the body 12 may consist of what is known as a "bloated" or cellular fired clay unit, which is formed by the interaction of an acid on a carbonate in a fluid clay mixture, followed by high temperature burning of the clay mixture after it has been allowed to set in its expanded form. Such a bloated or cellular clay unit may be directly secured to the facing 11 while the latter is in a moist state so as to secure a permanent union therebetween. Also, as shown in Fig. 8, the bloated clay body is indicated at 14, and to two or more of the sides thereof, there is permanently secured therewith tile facings 15 formed in accordance with the present invention. A wall as disclosed in Fig. 6 possesses many advantages, among which may be enumerated its exceptional thinness, whereby to economize in floor space when many partitions are in use. Second, the unit is relatively light in weight, forms a good heat insulator by reason of the cellularity of the body 14 and likewise comprises a material which will resist transmission of sound. These units, as indicated in Fig. 6, may be of standard size and quickly erected in wall forming order and exteriorly the surfaces present the appearance of decorative tile. It will be understood that one or more of the tile layers 15 may be united with the cellular body 14.

By molding the tile in the pans, the marginal edges of the finished tile will possess a substantially rounded configuration. These rounded edges are highly desirable, not only from the standpoint of their improved appearance over the ordinary sharp edged tile but for the additional reason that they offer considerable more resistance to chipping, cracking or breaking when in use. In tile manufacture as conducted heretofore with heavy presses, but slight flexibility has been provided in the matter of varying colored designs. In such prior tile, it has been customary to produce only solid colors or fixed designs, whereas through the present invention, the number of designs or color formations imparted to the outer surface of the tile is substantially without limit since by reason of the fluid state of the primary or facing mixture, colors may be blended and distributed to produce a great variety of patterns or color combinations. The vibrating action imparted to the primary mixture not only removes the air entirely in making the finished product of glass-like smoothness, but such vibration blends the colors together in a way that, it is believed, has never been done heretofore. After the new tile has been formed and finished, it is removed from the vibrating machine and is allowed to remain on the mold until the cement is set up or hardened, which usually requires about twenty-four hours. The finished tile may then be placed on curing frames where it is kept moist and warm until it is thoroughly hardened. No heating or polishing is required to produce the smooth satin-like finish that is found on the exterior surface of the tile. My improved tile can be produced in an unlimited number of color combinations or designs ranging from the most brilliant colorings to those delicate tints or pastel shades for which there is at present a considerable demand. The tile may be formed in units ranging from one-quarter of an inch to three or more inches in thickness as well as all desired linear measurements, including the customary 3 x 3, 4 x 4, 3 x 6, 6 x 6, 6 x 12, 12 x 12, inch sizes. Likewise, larger sizes may be produced when desired. By the method of casting the tile, there is no warping or unevenness in the finished product. Further, the concrete tile readily bonds or holds securely to the mortar bed in which it is laid.

What is claimed is:

1. The method of producing a cementitious building unit, which consists in forming a fluid mixture of cementitious material having a substantially cream-like consistency, placing said mixture in a sheet metal pan-shaped mold having resilient side walls, vibrating the mold to dispel air from the mixture and to cause the completed unit to possess a hard smooth dense surface where it contacts with the surfaces of the mold, allowing the cementitious mixture therein to set and harden, and inverting and resiliently separating the sides of the mold to release the unit.

2. The method of making a bloated tile unit which comprises the steps of placing a moist cementitious facing material in a mold, vibrating the mold, and then placing a body layer of bloated material adjacent to said facing material while the latter is in a moist state and securing a permanent union therebetween.

3. In the method of producing molded tile, the step consisting of vibrating the tile forming material in a mold having the cement-parting characteristics and composed of a chromium alloy-stainless steel.

AUGUST H. SEXTON.